(No Model.)
A. CERRUTI.
FRUIT GRADER.
No. 534,783. Patented Feb. 26, 1895.
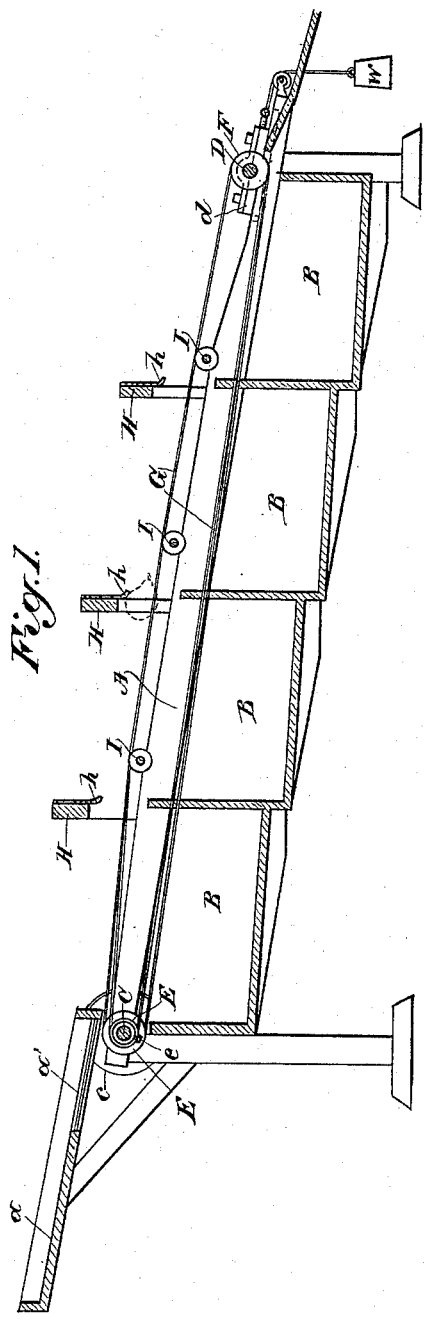
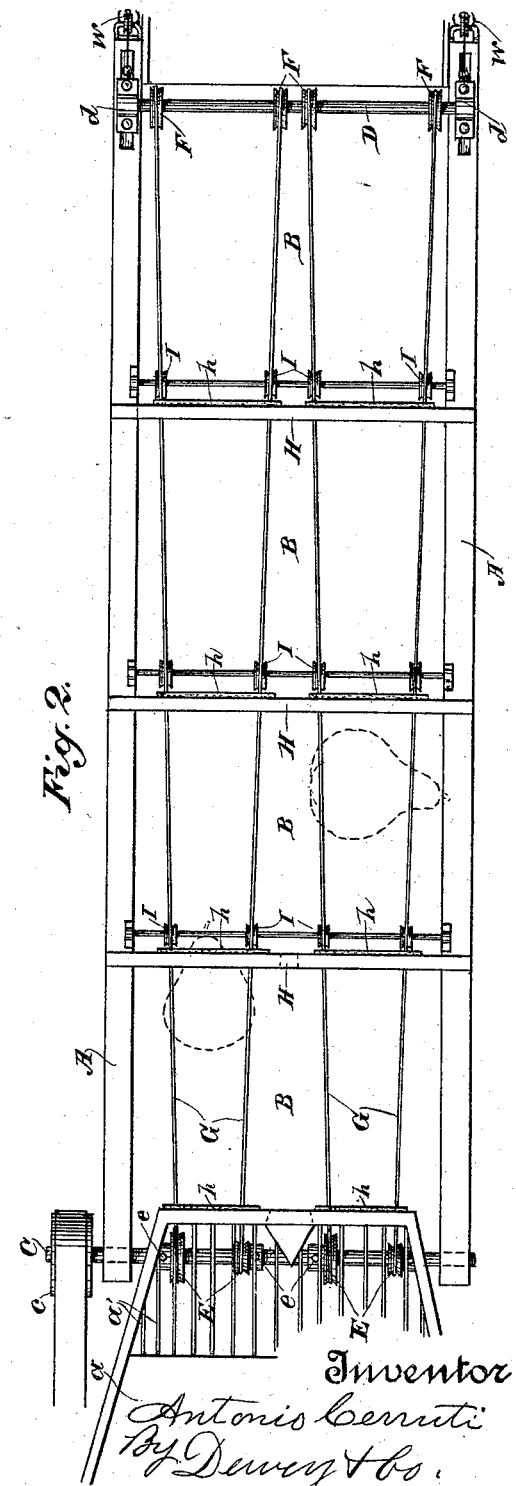
Witnesses,
Inventor
Antonio Cerruti
By Dewey & Co.
Attys

UNITED STATES PATENT OFFICE.

ANTONIO CERRUTI, OF SAN FRANCISCO, CALIFORNIA, ASSIGNOR OF TWO-THIRDS TO FONTANA & CO., OF SAME PLACE.

FRUIT-GRADER.

SPECIFICATION forming part of Letters Patent No. 534,783, dated February 26, 1895.

Application filed August 28, 1894. Serial No. 521,510. (No model.)

*To all whom it may concern:*

Be it known that I, ANTONIO CERRUTI, a citizen of the United States, residing in the city and county of San Francisco, State of California, have invented an Improvement in Fruit-Graders; and I hereby declare the following to be a full, clear, and exact description of the same.

My invention relates to the class of machines for separating fruit according to size, and it consists of the constructions and combinations of parts hereinafter described and claimed.

The general object of my invention is to provide a simple and effective fruit grader. Particular objects are to be found in the several features of improvements and will hereinafter appear.

Referring to the accompanying drawings for a more complete explanation of my invention,—Figure 1 is a longitudinal vertical section of my machine. Fig. 2 is a plan of same.

A is a suitable frame, the body of which is divided into a number of separate compartments B, to receive the different sizes of fruit. At the head of the frame is a feed platform $a$ terminating in a grate or sifter $a'$, by which the débris is separated from the fruit, as the latter passes upon the carriers of the grader. At the head or upper end of the frame, the top of which is mounted at an inclination, as here shown, is a shaft C to which power is applied by any suitable means, as, for example, by means of a belt to the pulley $c$.

At the lower or foot end of the machine is a shaft D. Upon the shaft C are pulleys E, and upon the shaft D are pulleys F. Between these pulleys extend carriers G which consist of traveling endless bands of any suitable material and construction.

In practice, ropes are found to serve the purpose, and I have here shown them as such.

The pulleys E upon the shaft C at the head of the machine are nearer together than the pulleys F upon the shaft D at the foot of the machine, whereby the endless carriers G travel in divergent paths from the head to the foot of the machine, and the space between the carriers gradually widens from the upper to the lower end. Adjacent carriers traveling in divergent paths, as just mentioned, form one pair, and there may be as many pairs of these carriers in the machine as may be desired for any suitable capacity. I have, for the sake of illustration, shown two pairs.

The operation of these parts as far as described is as follows:—The ungraded fruit rolls from the feed platform down upon the head of the carriers. It is supported by and between adjacent carriers, and is advanced by them. When the space between the two carriers becomes too wide, on account of their gradual divergence, for any fruit, said fruit will drop between them, while the larger ones will continue, until, as the space increases in width, the different sizes of fruit successively lose their support and drop between the carriers being thus assorted below in the different compartments B. In this operation there is no bodily rolling of the fruit, no jar, nor any forcible contact with any obstruction; but the fruit is carried along, without bruising, until its supports are lost, when it drops through.

I have, thus far, described my machine without reference to any difference in the rate of travel of the carriers of each pair, as my invention extends to the traveling carriers themselves irrespective of any difference in their rate of travel; for even when they travel at the same rate of speed, they will effect a very good assortment of the fruit; but in order to attain the highest efficiency in results, I make one of the carriers of each pair travel at a different rate of speed from that of the other member of the pair. This may be accomplished by any suitable and well known mechanism. I have, as the simplest form of such a mechanism, shown, in the present case, one of the pulleys E, as being larger than its adjacent pulley E, so that the carrier G, which passes over the larger pulley travels at a faster speed than that which passes over the smaller pulley E. This difference in the speed of the two carriers effects a turning of the fruit resting between them, and by this turning, the fruit is brought into the best position in which to fall through between the carriers, thus avoiding any clogging or any tendency to remain upon the carriers, by reason of the oblong shape of the fruit in some instances, or irregularities of any kind. In order, however, to insure this positive discharge of the fruit, by its being turned to the best position, I have, across the top of the frame, the cleats H to which are secured the flaps $h$ made of some soft or flexible material, and which hang down in the path of the fruit. These flaps temporarily arrest or have a tendency to arrest the fruit momentarily, or so obstruct its movement that the differently traveling carriers will have a better opportunity to turn it into the proper position. In order to keep the carriers taut, the boxes $d$ of the foot shaft D are mounted so that they can slide, and from these boxes weights W are suspended.

Although the carriers may travel in a straight plane I have found it best in order to increase their tautness and to prevent any sagging between the various supporting pulleys I, over which they pass, to arrange these supporting pulleys in a convex line so that the course of the carriers over them is in a convex path.

The various pulleys E are adjustably secured upon their shafts C by means of set screws $e$ so that they may be set closer to or farther from each other to vary the divergence of the members of each pair.

Having thus described my invention, what I claim as new, and desire to secure by Letters Patent, is—

1. In a fruit grader, traveling separated carriers mounted upon end supports and moving in lines which diverge from one end to the other, one of said carriers moving at a different rate of speed from that of the other carrier, substantially as herein described.

2. In a fruit grader, the combination of endless separated traveling carriers moving in divergent lines, and pulleys at each end over which the carriers pass, said pulleys being of different sizes whereby the rate of speed of one of said carriers is different from that of the other, substantially as herein described.

3. In a fruit grader, the combination, of endless traveling carriers separated from each other and moving in divergent lines, pulleys of different sizes at opposite ends of the machine around which the carriers pass whereby one carrier moves faster than the other, and means in the path of the fruit for temporarily arresting the movement of the same whereby its position between the carriers may be changed.

4. In a fruit grader, the combination of separated traveling carriers moving in divergent lines, one of said carriers moving at a different rate of speed from that of the other and the flexible arresting strips in the path of the fruit, substantially as herein described.

In witness whereof I have hereunto set my hand.

ANTONIO CERRUTI.

Witnesses:
WM. FRIES,
CHARLES A. LEMARD.